United States Patent
Park et al.

(10) Patent No.: US 10,802,780 B2
(45) Date of Patent: Oct. 13, 2020

(54) DIGITAL DEVICE AND METHOD FOR CONTROLLING SAME

(71) Applicant: LG ELECTRONICS INC., Seoul (KR)

(72) Inventors: Sihwa Park, Seoul (KR); Juhwan Lee, Seoul (KR); Sinae Chun, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 15/517,946

(22) PCT Filed: Oct. 8, 2014

(86) PCT No.: PCT/KR2014/009465
§ 371 (c)(1),
(2) Date: Apr. 7, 2017

(87) PCT Pub. No.: WO2016/056687
PCT Pub. Date: Apr. 14, 2016

(65) Prior Publication Data
US 2017/0315766 A1     Nov. 2, 2017

(51) Int. Cl.
*G06F 3/14* (2006.01)
*H04W 4/029* (2018.01)
*G06F 3/03* (2006.01)
*G06F 3/147* (2006.01)
*H04W 4/02* (2018.01)
*G06F 3/0354* (2013.01)
(Continued)

(52) U.S. Cl.
CPC .............. *G06F 3/14* (2013.01); *G06F 3/0304* (2013.01); *G06F 3/147* (2013.01); *H04W 4/02* (2013.01); *H04W 4/029* (2018.02); *G06F 3/03547* (2013.01); *G06F 3/0488* (2013.01); *H04W 84/18* (2013.01)

(58) Field of Classification Search
CPC .......... G06F 3/14; G06F 3/0304; G06F 3/147; H04W 4/029; H04W 84/18
See application file for complete search history.

(56) References Cited

U.S. PATENT DOCUMENTS

2006/0036294 A1*   2/2006   Tehrani ................ A61N 1/3601
                                                                      607/42
2013/0159234 A1    6/2013   Xing et al.
(Continued)

FOREIGN PATENT DOCUMENTS

WO       2012022021       2/2012

OTHER PUBLICATIONS

PCT International Application No. PCT/KR2014/009465, Written Opinion of the International Searching Authority dated Jun. 11, 2015, 26 pages.

*Primary Examiner* — Roland J Casillas
(74) *Attorney, Agent, or Firm* — Lee Hong Degerman Kang & Waimey (57) ABSTRACT

A digital device according to an embodiment of the present description can receive attribute information from an external device and generate attribute information of the digital device on the basis of context information of the digital device. Moreover, the digital device can provide one or more recommended activities by matching the generated attribute information of the digital device and the attribute information of the external device.

3 Claims, 7 Drawing Sheets

(51) Int. Cl.
   *G06F 3/0488*   (2013.01)
   *H04W 84/18*   (2009.01)

(56) References Cited

U.S. PATENT DOCUMENTS

| | | | |
|---|---|---|---|
| 2013/0204967 A1* | 8/2013 | Seo | H04L 43/00 |
| | | | 709/217 |
| 2014/0087711 A1 | 3/2014 | Geyer et al. | |
| 2014/0128021 A1 | 5/2014 | Walker et al. | |
| 2014/0244710 A1* | 8/2014 | Sharma | H04L 67/12 |
| | | | 709/201 |
| 2015/0061862 A1* | 3/2015 | Lee | H04M 1/7253 |
| | | | 340/539.11 |
| 2016/0058337 A1* | 3/2016 | Blahnik | A61B 5/1112 |
| | | | 600/595 |

\* cited by examiner

DIGITAL DEVICE AND METHOD FOR CONTROLLING SAME

CROSS-REFERENCE TO RELATED APPLICATIONS

This application is the National Stage filing under 35 U.S.C. 371 of International Application No. PCT/KR2014/009465, filed on Oct. 8, 2014, the contents of which are all hereby incorporated by reference herein in its entirety.

TECHNICAL FIELD

The present invention relates to a digital device and a method of controlling therefor.

BACKGROUND ART

As a portable device has come into wide use, a device provides various functions for user convenience. For example, the device can provide a user with a function of managing a thing to do and schedule of the user. A device in which a schedule application is installed can provide a notification to a user based on a schedule directly inputted by the user. Yet, it is very difficult for the user to directly input schedules on many things.

With the help of the construction of ubiquitous environment, an enhanced method of managing a schedule has been proposed. For example, if a user device exists at a position adjacent to a specific device, the user device can provide a notification on the specific device to a user. The notification on a schedule can be classed as a location based service. The location based service has a merit in that it is very simple to implement the service. Yet, a location based notification does not sufficiently consider an attribute of a specific device and activity of a user. Moreover, if a user deviates from a designated position, it is difficult to provide the notification to the user. Hence, it is necessary to have a method capable of minimizing inconvenience of a user and informing the user of a thing to do at appropriate timing.

And, communication with various devices is enabled with the development of IoT (Internet of Things). Hence, it is necessary to have an intelligent service using the IoT technology.

DISCLOSURE OF THE INVENTION

Technical Task

The present specification intends to provide a digital device providing a notification based on information on an external device and context information of a user and a method of controlling therefor. In particular, the present specification intends to provide a digital device providing a more enhanced intelligent notification by matching attribute information of an external device and context information of a user.

Technical Solution

To achieve these and other advantages and in accordance with the purpose of the present invention, as embodied and broadly described, according to one embodiment, a digital device includes a communication unit configured to communicate with one or more external devices, a context sensing unit configured to sense context information of the digital device, and a processor configured to control the communication unit and the context sensing unit, the processor configured to receive one or more first attribute of an external device sensed by the external device, the processor configured to generate one or more second attributes based on the sensed context information, the processor configured to generate a recommended activity for the external device by matching the one or more first attributes with the one or more second attributes.

To further achieve these and other advantages and in accordance with the purpose of the present invention, according to a different embodiment, a digital device includes an image sensing unit, a context sensing unit configured to sense context information of the digital device, and a processor configured to control the image sensing unit and the context sensing unit, the processor configured to sense an external object from an image sensed by the image sensing unit, the processor configured to generate one or more first attributes associated with the sensed external object based on the sensed image, the processor configured to generate one or more second attributes based on the sensed context information, the processor configured to generate a recommended activity for the external object by matching the one or more first attributes with the one or more second attributes.

Advantageous Effects

According to the present specification, a digital device can provide a recommended activity to a user.

According to the present specification, a digital device can recommend an activity more associated with environment of a user by generating the recommended activity based on context information of the user.

BEST MODE

While embodiments are concretely described with reference to the attached diagrams and the contents written on the diagrams, the present specification may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 1:
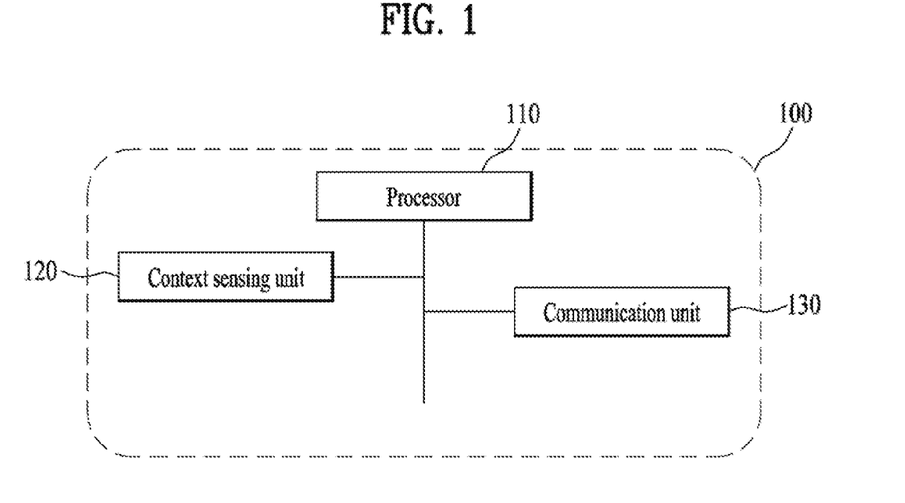
FIG. 1 is a diagram for a configuration of a digital device according to one embodiment.

FIG. 1 is a diagram for a configuration of a digital device according to one embodiment.

A digital device 100 according to one embodiment of the present specification can include a communication unit 130 configured to communicate with one or more external devices, a context sensing unit configured to sense context information of the digital device 100, and a processor 110 configured to control the communication unit 130 and the context sensing unit 120.

The communication unit 130 can receive information from one or more external devices. The information received from the external device can include attribute information associated with the external device. The external device can transmit predetermined information (e.g., name and type of the external device) indicating an attribute of the external device to the digital device 100 as attribute information. And, the external device can include sensors for sensing a current state of the external device and may be able to transmit information of the external device sensed by the sensors to the digital device as attribute information. The communication unit 130 performs communication with the external device using various protocols via a wired or wireless network and can transceive data with the external device. For example, in order to access a wireless network, the communication unit 130 may use such a standard as Wireless LAN (WLAN), IEEE 802.11 based wireless LAN communication, Wireless Broadband (WiBro), World Interoperability for Microwave Access (WiMAX), High Speed Downlink Packet Access (HSDPA), Bluetooth, Near Field Communication (NFC), and the like. And, the communication nit 130 can access the Internet via a wired/wireless network. And, the external device can transmit attribute information to the communication unit 130 using the above-mentioned wired/wireless network standard. Moreover, the external device may transmit attribute information to the communication unit 130 via the Internet.

The context sensing unit 120 can sense context information of the digital device 100. For example, the context sensing unit can include an image sensor, an acceleration sensor, a gyro sensor, a terrestrial magnetism sensor, a GPS sensor, a pressure sensor, an altitude sensor, a proximity sensor, an audio sensor, or a sensor for measuring surrounding of the digital device 100.

The processor 110 can control the context sensing unit 120 and the communication unit 130. The processor 110 can also control other configurations included in the digital device 100 described in the following. The processor 110 processes data of the digital device 100 to execute various applications. The processor 110 can control the digital device 100 and contents executed in the digital device 100 based on a command.

The digital device 100 can further include configurations not depicted in FIG. 1. For example, the digital device 100 can further include a memory, a power source, housing, a display unit (e.g., a touch sensitive display unit), an audio receiving unit, an audio outputting unit, a location determination unit, and an image sensing unit. The image sensing unit can sense an image using visible ray, infrared lays, ultraviolet rays, magnetic field, and/or sound wave.

The aforementioned configurations can be selectively combined according to the selection of manufacturer or a shape of the digital device 100. The aforementioned configurations can be connected with each other via a bus and can be controlled by the processor 110.

Meanwhile, the configuration of the digital device 100 shown in FIG. 1 corresponds to a block diagram according to one embodiment. Blocks separated from each other correspond to logically separated hardware configuration units. Hence, the configurations units of the digital device 100 can be implemented by a single chip or a plurality of chips depending on a device design.

Meanwhile, the digital device 100 according to the present specification can be controlled based on various inputs. For example, the digital device 100 can include a physical button and may receive an input from the physical button. And, the digital device can include a voice reception unit. The digital device can perform voice recognition based on received voice and can be controlled based on voice recognition. Specifically, the digital device 100 can perform voice recognition in a unit of a syllable, a word, or a sentence. The digital device can perform the voice recognition function by combining recognized syllables, words, or sentences. And, the digital device can perform image analysis using the image sensing unit and can be controlled based on an analyzed image. And, the digital device may include a touch sensing unit and can be controlled based on a touch inputted on the touch sensing unit. Moreover, the digital device 100 can be controlled based on the combination of the aforementioned inputs.

Figure 2:
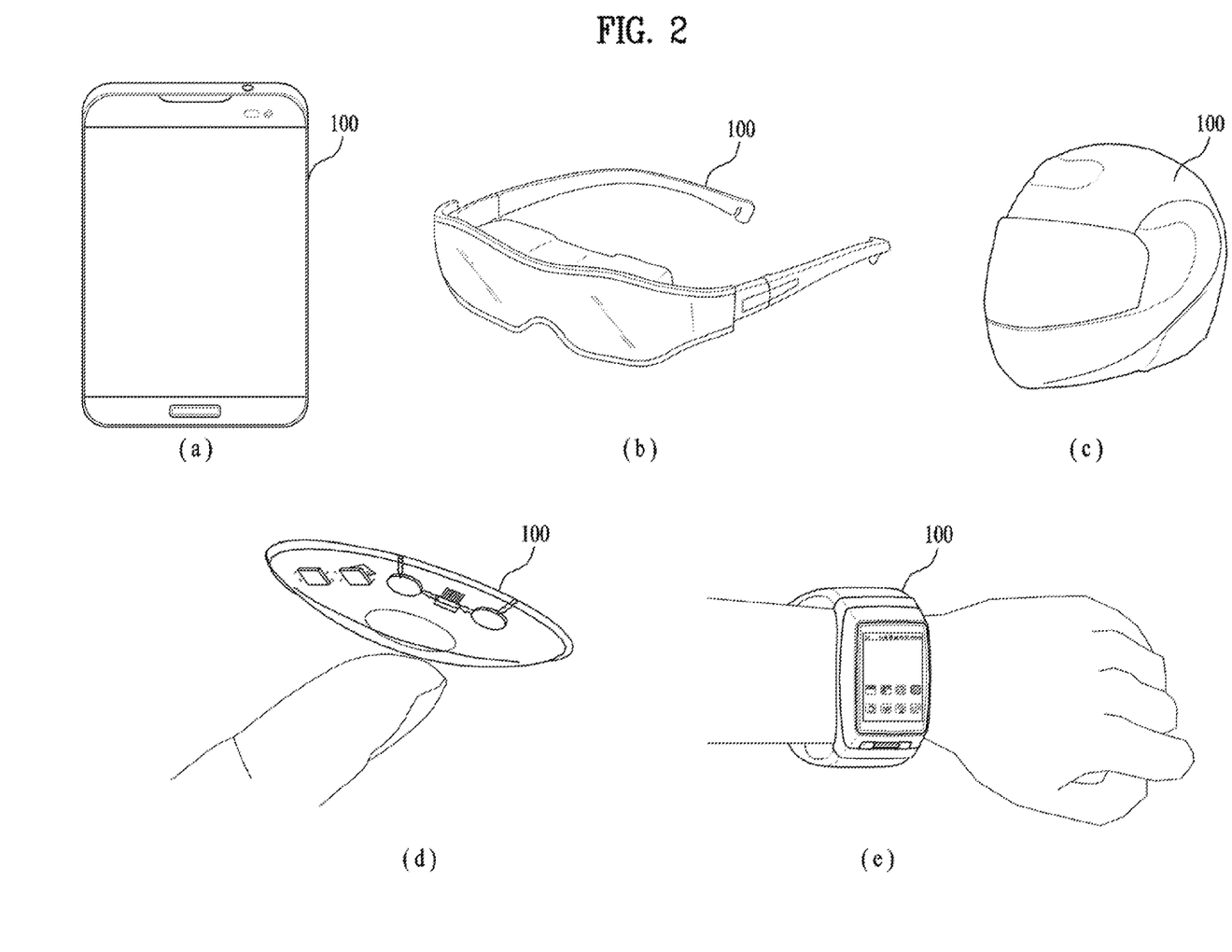
FIG. 2 is a diagram for embodiments of a digital device.

FIG. 2 is a diagram for embodiments of a digital device.

The digital device according to the present specification may have various shapes. For example, the digital device may correspond to a portable device or a wearable device. However, the digital device 100 is not restricted by examples of the digital device 100 described in FIG. 2. For example, the digital device may correspond to a table clock. Devices of all types capable of providing a notification to a user can be included in the digital device 100 of the present specification.

For example, as shown in FIG. 2(a), the digital device 100 may have a shape of a mobile phone. And, as shown in FIG. 2(b), the device 100 may have a shape of a HMD (head mounted display). And, as shown in FIG. 2(c), the digital device 100 may correspond to a HMD of a helmet shape. And, as shown in FIG. 2(d), the digital device 100 may have a shape of lens (e.g., smart lens). And, as shown in FIG. 2(e), the digital device 100 may correspond to a smart watch.

In the following, operations performed in the digital device 100 are explained with reference to FIGS. 3 to 10. The configuration of the digital device 100 mentioned earlier with reference to FIGS. 1 and 2 can be used for the operations of the digital device 100 described in the following. In the following, it may assume that the operation of the digital device 100 and the operation of the processor 110 are the same.

Figure 3:
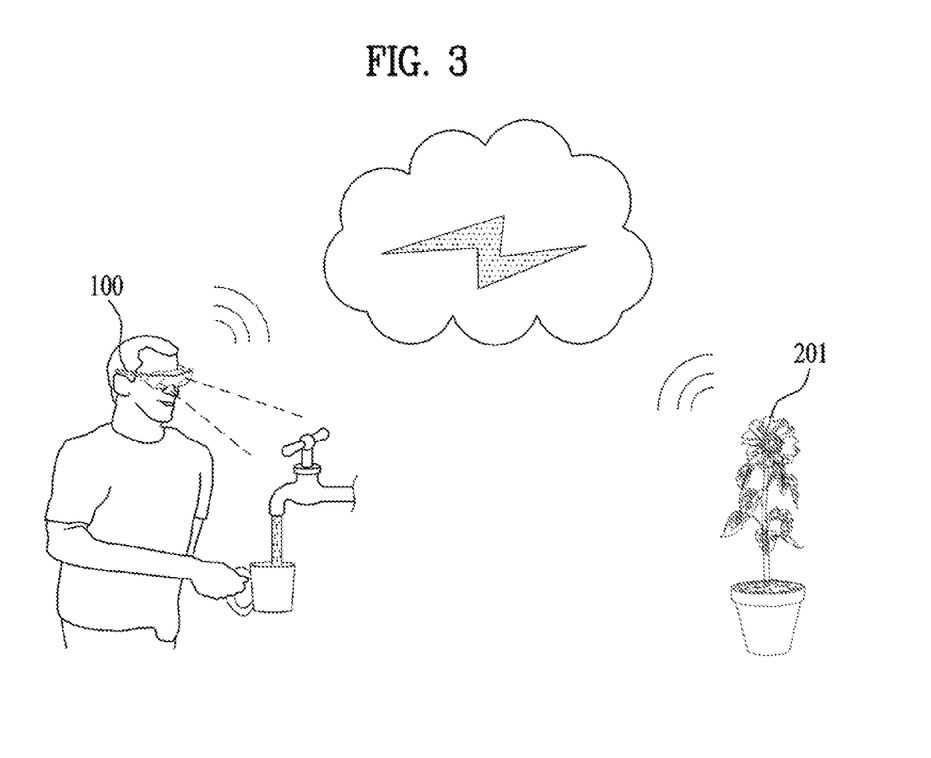
FIG. 3 is a diagram for communication between a digital device and an external device according to one embodiment.

FIG. 3 is a diagram for communication between a digital device and an external device according to one embodiment.

Referring to FIG. 3, the digital device has a shape of a HMD. And, an external device 201 corresponds to a pot. In an embodiment of FIG. 3, the external device 201 communicates with the digital device 100. And, the external device 201 can include a sensor. For example, the external device 210 can include a sensor configured to measure amount of moisture.

The external device 201 can transmit attribute information to the digital deice 100. The attribute information can include a name, a type, and a current state of the external device 201 and/or various informations associated with the external device. The external device 201 may transmit the attribute information to the digital device in response to a request of the digital device 100. And, the external device 201 can periodically transmit the attribute information to the digital device 100. And, the external device can transmit the attribute information to the digital device 100 when a predetermined condition of the external device 201 is satisfied. Moreover, the external device 201 can transmit the attribute information to the digital device when a distance between the external device 201 and the digital device 100 is less than a predetermined distance.

As mentioned in the foregoing description, the digital device 100 can receive the attribute information of the external device 201. The digital device 100 can receive the attribute information periodically or at predetermined random time. Moreover, the digital device 100 can ask the external device 201 to transmit the attribute information. And, the digital device 100 can receive the attribute information based on a predetermined condition of the external device 201 and/or based on a distance between the digital device 100 and the external device 201. And, the aforementioned schemes of communicating the attribute information between the digital device 100 and the external device 201 can be selectively combined.

As mentioned in the foregoing description, the digital device 100 can periodically or aperiodically receive the attribute information. And, the digital device 100 can determine a location of the digital device 100 using a location determination unit. And, the digital device may determine a location of the external device 201 based on the attribute information of the external device 201. And, the digital device 100 can determine a distance between the digital device 100 and the external device 201 based on response time and strength of a response signal received from the external device 201. And, the digital device 100 can receive the attribute information of the external device 201 when a distance between the digital device 100 and the external device 201 is less than a predetermined distance.

For example, the external device 201 shown in FIG. 3 may include a moisture sensor. In this case, if measured amount of moisture is equal to or less than a predetermined amount of moisture, the external device 201 can transmit the attribute information to the digital device 100. And, the external device 201 can record a date on which the amount of moisture has increased. In this case, the external device 201 can record a date on which water is provided to the pot (external device 201) based on the amount of moisture. And, the external device 201 can determine a period elapsed from a date on which water has provided to the pot. Hence, if the period exceeds a predetermined period, the external device 201 can transmit the attribute information to the digital device 100.

For example, in FIG. 3, a name of the external device 201 may correspond to "pot". The attribute information of the external device can include the name and "amount of moisture". Hence, the digital device 100 can determine whether or not the pot (external device 201) needs water based on the received attribute information (e.g., amount of moisture).

The digital device 100 can generate attributes associated with the external device 201 based on at least one selected from the group consisting of a name of the external device 201, a type of the external device 201, and status information of the external device 201. For example, the digital device 100 may use the received attribute information itself as an attribute of the external device 201. Yet, the digital device 100 can also generate secondary attribute information based on the received attribute information of the external device 201. For example, the attribute information can also be referred to as status information. In this case, the digital device 100 can receive status information from the external device 201. For example, the status information received from the external device 201 may include a name of the external device 201 and amount of moisture. And, the digital device 100 can generate attribute information of the external device 201 based on the received status information. For example, the digital device 100 can generate attribute information associated with the external device 201 such as "water" and "necessity" based on the amount of moisture received from the external device. In particular, the digital device not only uses the received attribute information itself but also generates attribute information which is expanded based on the received attribute information. The aforementioned status information and the attribute information can be regarded as the same information and the status information is used to distinguish the status information from the secondary attribute information. Hence, those skilled in the art can understand that both the attribute information and the secondary attribute information derived from the attribute information can be used as attribute information associated with the external device 201.

And, the digital device 100 can sense context information of the digital device 100 using a context sensing unit. The digital device can sense the context information based on at least one selected from the group consisting of a frequency, amplitude, and a tone of sound sensed by a sound sensor of the context sensing unit. And, the digital device 100 can sense the context information based on one or more objects included in an image sensed by an image sensor of the context sensing unit. And, the digital device 100 can sense the context information based on humidity sensed by a humidity sensor of the context sensing unit. And, the digital device 100 can sense the context information based on speed and/or acceleration sensed by a speedometer and/or an accelerometer of the context sensing unit. And, the digital device 100 can sense the context information based on at least one of an angular speed and orientation sensed by a gyro sensor of the context sensing unit.

For example, the digital device 100 can sense that the digital device is located at a bathhouse based on sensed humidity. And, for example, the digital device 100 can sense that the digital device is in the subway based on sensed sound. And, for example, the digital device 100 can sense that the digital device is moving based on sensed speed. The context information can be selectively combined. For example, the digital device 100 can sense that the digital device 100 is in the moving subway based on sensed sound and speed.

For example, the digital device 100 can sense the context information using an image sensor. For example, the digital device 100 can identify a faucet and a cup based on a sensed image. And, the digital device 100 can identify water based on a sensed image. The digital device 100 can identify one or more objects based on a sensed image. The digital device 100 can sense the context information based on an identified object. For example, referring to FIG. 3, the digital device 100 identifies "water" and "cup" as objects and can sense context information such as "pour water" or "pour water into a cup" based on the identified objects.

And, the digital device 100 can generate attribute information associated with the digital device 100 based on sensed context information. For example, referring to FIG. 3, the digital device 100 can generate attribute information such as "water" and "supply" based on the context information such as "pour water" or "pour water into a cup".

In the following, for clarity, attribute information associated with the external device 201 and attribute information associated with context information of the digital device 100 are referred to as a first attribute and a second attribute, respectively. The digital device 100 can match the first attribute associated with the external device 201 with the second attribute associated with the digital device 100. For example, in FIG. 3, the first attribute may correspond to "water" and "necessity" and the second attribute may correspond to "water" and "supply".

The matching between the first and the second attribute can be performed based on identity, similarity, and/or association. For example, in FIG. 3, the digital device 100 can match the first attribute and the second attribute such as "water" based on the identity. And, the digital device 100 can match the first attribute such as "necessity" with the second attribute such as "supply" based on the association. Moreover, in order to match the first attribute with the second attribute, the digital device 100 can perform at least one selected from the group consisting of coincidence search, similarity search, and semantic search on the first attribute using the second attribute as a keyword. On the contrary, if the first attribute of the external device 201 corresponds to "water" and "sufficient", the second attribute and the first attribute may not be matched.

For example, in FIG. 3, the first attribute of the external device 201 may correspond to "water" and "necessity" and the second attribute of the digital device 100 may correspond to "water" and "supply". In this case, if "necessity" is matched with "supply" for "water" of the digital device 100, it may be able to provide a recommended activity to a user. For example, the recommended activity may correspond to "supply" of "water" to the external device 201.

As a different example, if a part of the first attribute is matched with a part of the second attribute, the digital device 100 can provide a recommended activity to a user. Yet, although a part of the first attribute is matched with a part of the second attribute, the digital device 100 may not provide a recommended activity to a user. For example, in FIG. 3, when the first attribute corresponds to "water" and "sufficient" and the second attribute corresponds to "water" and "supply", although the attributes of "water" are matched, "sufficient" and "supply" are contrary to each other in a broad sense. Hence, the digital device 100 may not generate any recommended activity for the external device 201.

Hence, when the digital device 100 generates a recommended activity, an attribute of the recommended activity can be generated based on a current activity of a user of the digital device 100. For example, if a user drinks water, the digital device 100 can generate such a recommended activity as watering the pot.

The digital device 100 can use a database embedded in the digital device to match the first attribute with the second attribute. Or, the digital device 100 can use an external database to match the first attribute with the second attribute. For example, the digital device 100 can digitize association between the first attribute and the second attribute based on frequency of attributes stored in the external database.

Meanwhile, although it is depicted as first attribute is received from one external device 201 in FIG. 3, the digital device 100 can receive first attribute of each of a plurality of external devices from each of a plurality of the external devices. For example, the digital device 100 receives the first attribute of each of a plurality of the external devices and can generate a database associated with the first attributes. And, the digital device 100 generates a second attribute of the digital device and matches the generated second attribute with the first attributes of the previously generated database to generate a recommended activity associated with the matched external device. As mentioned in the foregoing description, when the first attribute and the second attribute are matched, it may be able to use various methods such as search and the like. It may be able to generate a more enhanced intelligent recommended activity based on various matching methods between the first attribute and the second attribute.

And, reception of the first attribute, generation of the second attribute, and matching between the first attribute and the second attribute can be performed at the same time or different time. For example, if the first attribute is received from the external device 201, the digital device 100 generates the second attribute and matches the second attribute with the first attribute. On the other hand, the digital device 100 can match the second attribute with the first attribute after a prescribed time elapses from the time at which the first attribute is received from the external device 200.

The operations of the digital device 100 mentioned earlier with reference to FIG. 3 can be selectively combined with operations of the digital device 100 described in the following with reference to FIGS. 4 to 10.

Figure 4:
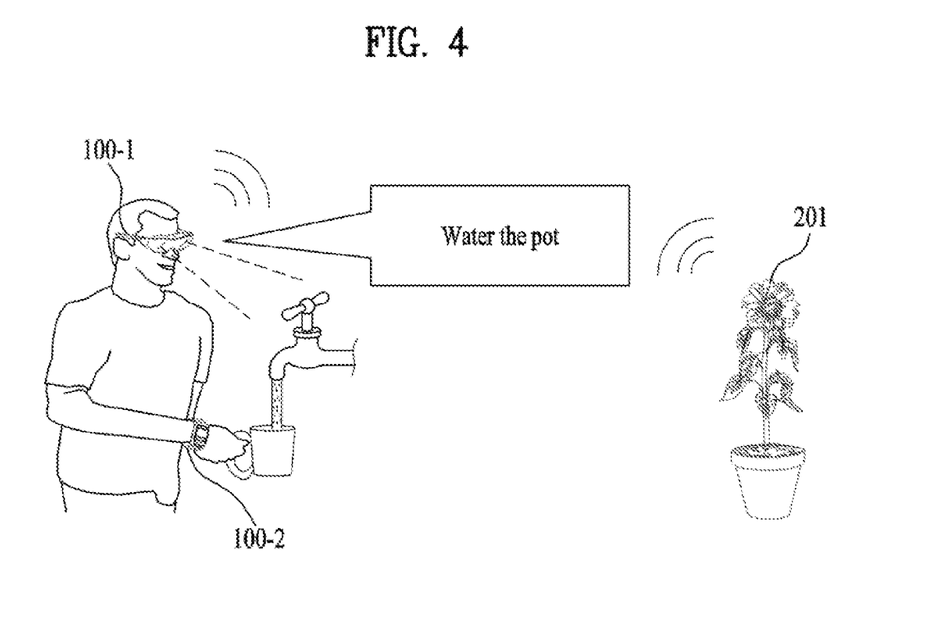
FIG. 4 is a diagram for a notification associated with an external device notified by a digital device according to one embodiment.

FIG. 4 is a diagram for a notification associated with an external device notified by a digital device according to one embodiment.

The digital device 100-1 or 100-2 can provide a notification to a user based on a recommended activity. The notification can include at least one selected from the group consisting of visual feedback, auditory feedback, and tactile feedback.

Referring to FIG. 4, the digital device 100-1 provides a user with a notification including visual feedback such as "water the pot". For example, the digital device 100-1 may display such a phrase as "water the pot" on a display unit of the digital device 100-1. And, the digital device 100-1 may output such a phrase as "water the pot" via a voice output unit. Along with the notification, the digital device 100-1 may provide vibration to a user.

Referring to FIG. 4, a user is wearing two digital devices 100-1, 100-2. As mentioned earlier with reference to FIGS. 1 and 3, the digital device 100-1/100-2 can autonomously sense context information of the digital device 100-1/100-2. On the other hand, the digital device 100-1 can sense the context information of the digital device 100-1 together with the digital device 100-2. For example, the digital device 100-1 can be coupled with the digital device 100-2. In this case, the digital device 100-1 can sense the context information using visual information. And, the digital device 100-2 can sense the context information using auditory information. The digital device 100-1 senses the context information from the different digital device 100-2 and may be able to combine the received context information and the context information sensed by the digital device 100-1 with each other. And, the digital device 100-1 can generate a second attribute based on the combined context information.

Meanwhile, a notification of the digital device 100-1 can be interlocked with a schedule application of the digital device 100-1. For example, a new schedule can be automatically generated on the schedule application based on an activity recommended by the digital device 100-1. And, the digital device 100-1 can provide a notification to a user based on the new schedule on the schedule application.

The combination between the notification, which is provided by the digital device 100-1/100-2, and the context information of the digital device 100-1/100-2 can be selectively combined with the operations of the digital device (100 of FIG. 3) mentioned earlier with reference to FIG. 3.

Figure 5:
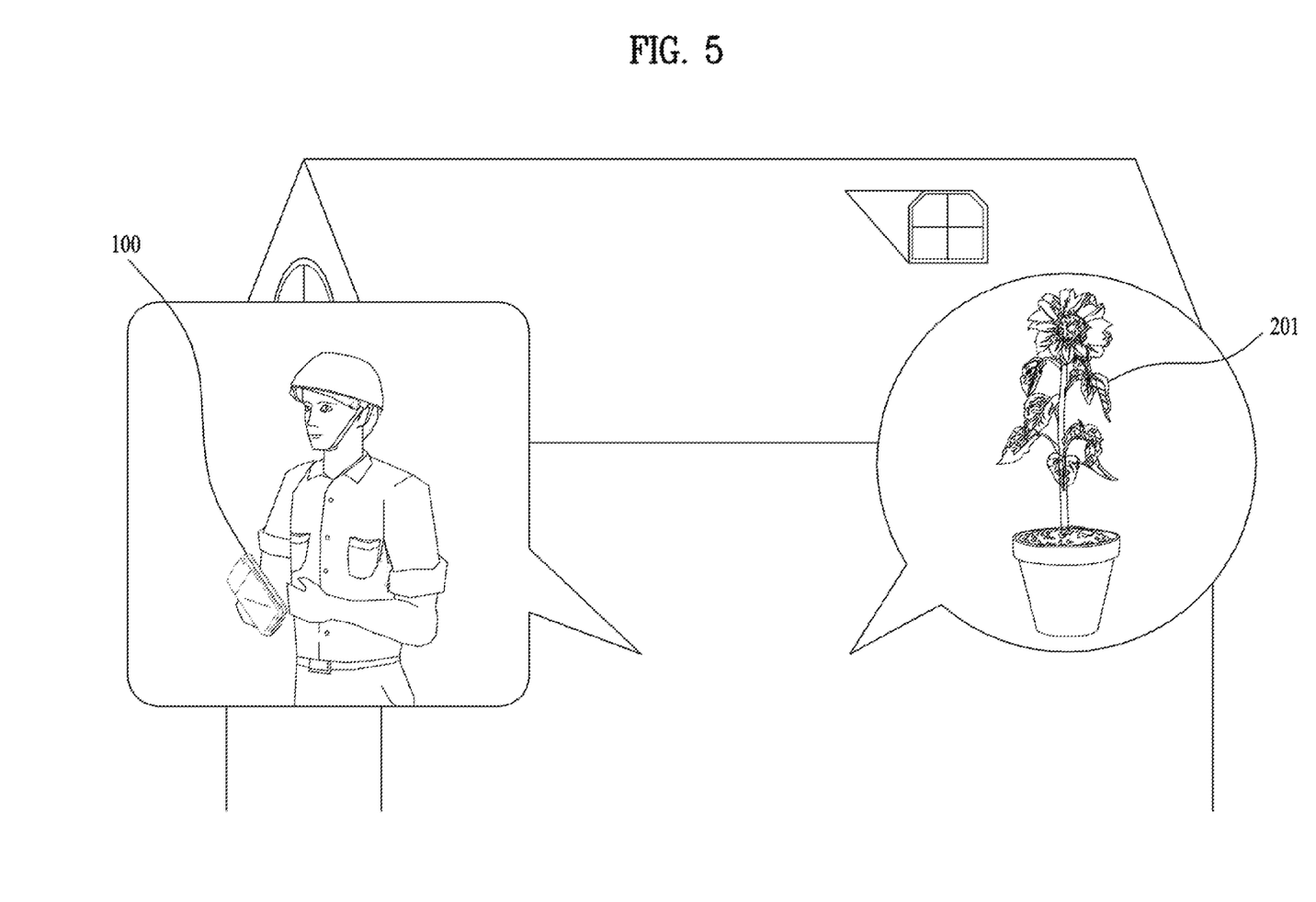
FIG. 5 is a diagram for a communication range between a digital device and an external device according to one embodiment.

FIG. 5 is a diagram for a communication range between a digital device and an external device according to one embodiment.

For example, assume a situation that the external device 201 is in the house and the digital device 100 is out of the house. In this case, if a notification on the external device 210 is provided to a user via the digital device 100 located at the outside of the house, it may cause inconvenience to the user. Hence, the digital device 100 can provide the notification on the external device 201 to the user only when the digital device 100 and the external device 201 are located within a prescribed distance.

And, the digital device 100 can determine a location of the digital device 100 using a location determination unit. And, the digital device 100 can determine a location of the external device 201 based on attribute information of the external device 201. The digital device 100 can determine a distance between the digital device 100 and the external device 201 based on locations of the digital device 100 and the external device 201. And, the digital device 100 can determine a distance between the digital device 100 and the external device 201 based on response time and strength of a response signal received from the external device 201.

Referring to FIG. 5, the digital device 100 provides a notification to a user only when a distance between the digital device 100 and the external device 201 is less than a predetermined distance. For example, the predetermined distance can be configured to include all of a size of the house. Referring to FIG. 5, both the digital device 100 and the external device 201 are in the house. In this case, if a user of the digital device 100 performs an activity associated with an attribute of the external device 201, the digital device 100 can provide a recommended activity associated with the external device 201 to the user. On the contrary, if the user of the digital device 100 is out of the house, the digital device may not provide a recommended activity associated with the externa device 201 to the user.

The notification provided by the digital device 100 mentioned earlier with reference to FIG. 5 can be selectively combined with the operations of the digital device mentioned earlier with reference to FIG. 4.

Figure 6:
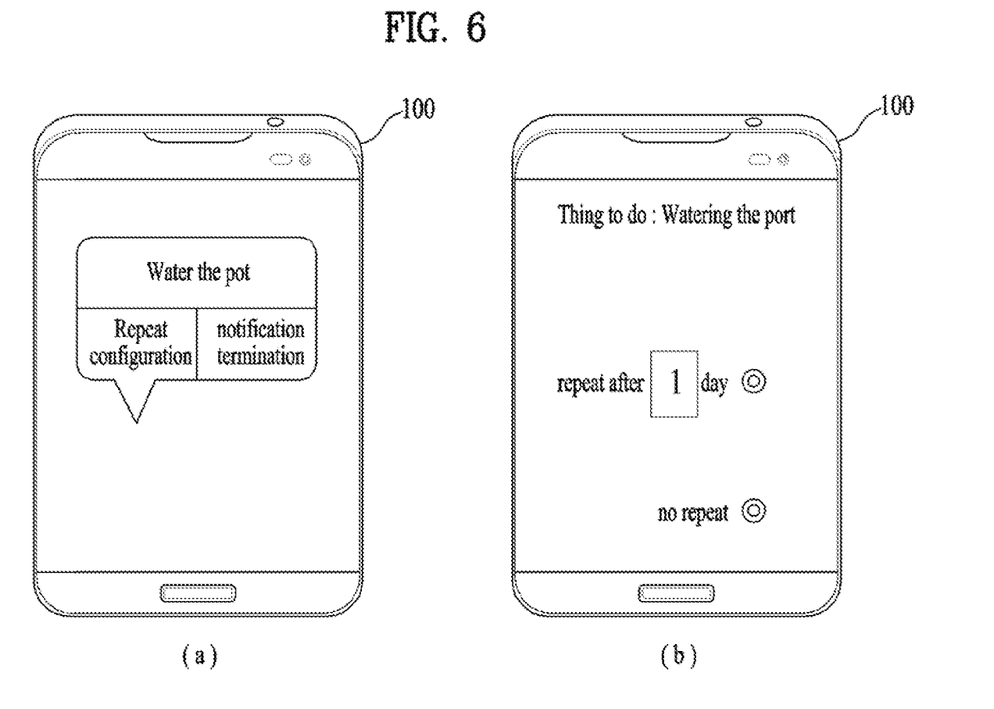
FIG. 6 is a diagram for an interface of a digital device according to one embodiment.

FIG. 6 is a diagram for an interface of a digital device according to one embodiment.

As mentioned earlier with reference to FIG. 1, the digital device 100 can include a touch-sensitive display unit configured to display at least one or more images. If a notification is provided based on a recommended activity mentioned earlier with reference to FIGS. 3 to 5, the digital device 100 can provide a user interface to the touch-sensitive display unit to control the notification. And, the user interface can include at least one selected from the group consisting of an interval of the notification, frequency of the notification, and termination of the notification.

For example, referring to FIG. 6(a), the digital device displays an interface for determining whether or not a notification is repeated and whether or not a notification is terminated on the display unit together with a notification such as "water the pot". A user touches the interface to select the repeat of the notification and the termination of the notification. And, referring to FIG. 6(b), the digital device displays an interface for determining whether or not a notification is repeated on the display unit together with a notification such as "watering the pot". A user determines a repetition interval to determine an interval of providing a notification again. And, the interface shown in FIG. 6(b) may correspond to an interface which is provided in response to a touch input inputted on the "repetition configuration" of FIG. 6(a).

FIG. 6 illustrates an example of an interface of the digital device 100. An interface of the digital device according to the present specification is not restricted by the interface shown in FIG. 6.

And, the interface shown in FIG. 6 can be selectively combined with the notification of the digital device mentioned earlier with reference to FIGS. 4 and 5.

Figure 7:
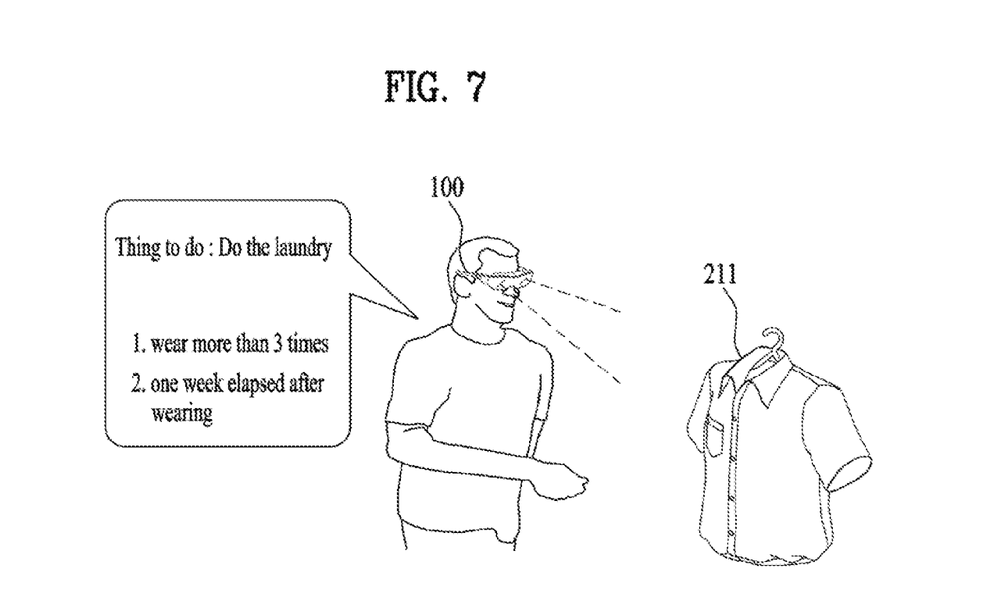
FIG. 7 is a diagram for a digital device recognizing an external object according to one embodiment.

FIG. 7 is a diagram for a digital device recognizing an external object according to one embodiment.

Figure 8:
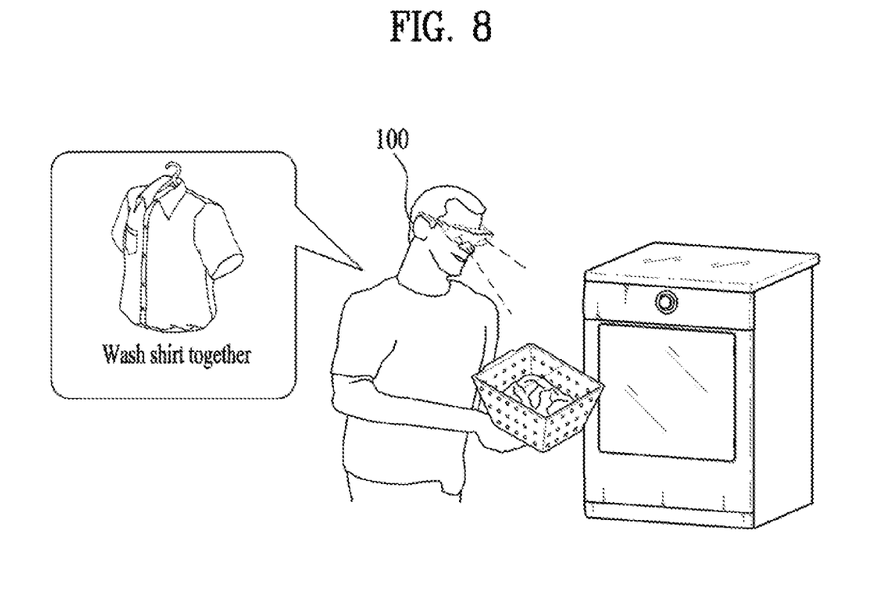
FIG. 8 is a diagram for a notification associated with an external object notified by a digital device according to one embodiment.

As mentioned earlier in FIGS. 3 to 5, the digital device can receive attribute information from the external device. Referring to FIGS. 3 to 5, the external device can communicate with the digital device. An external object 211, which is described in the following with reference to FIGS. 7 and 8, is unable to communicate with the digital device 100. Hence, the digital device 100 is unable to receive attribute information from the external object 211.

Hence, the digital device shown in FIG. 7 directly generates the attribute information of the external object 211. In particular, the digital device shown in FIG. 3 generates attribute information from the external device, whereas the digital device 100 shown in FIG. 7 generates the attribute information of the external object 211. However, since sensing of context information, generation of attribute information associated with the digital device 100, and generation of a recommended activity are identical to what is mentioned earlier with reference to FIG. 3, a method of generating the attribute information of the external object 211 is explained in the following.

Referring to FIG. 7, the digital device 100 includes an image sensing unit. The image sensing unit senses an image positioned at the outside of the digital device 100. Although it is logically separated, the image sensing unit may correspond to a part of a context sensing unit. The digital device 100 can sense at least one or more external objects from the image sensed by the image sensing unit. And, the digital device 100 can generate attribute information associated with the external object 211 which is sensed based on the sensed image.

For example, the digital device 100 can sense a shirt as an external object 211 using the image sensing unit. For example, the shirt can be identified based on a color and a shape. And, the digital device 100 can generate an attribute for the sensed external object 211.

For example, the digital device 100 can generate such attribute information as "clothes" for the shirt 211 based on a shape of the shirt 211.

And, the digital device 100 can generate a status of the identified shirt 211 as attribute information. For example, the digital device 100 can generate the attribute information of the shirt 211 as "dirty" or "clean" based on an image (e.g., a stain) of the identified shirt 211.

And, the digital device 100 can update the attribute information of the identified external object 211. For example, the number of times of wearing the shirt and the number of days of wearing the shirt can be recorded as attribute information. In particular, the attribute information of the external object 201 can be updated several times over time. For example, when a user of the digital device 100 look into a mirror, the digital device 100 can identify clothing of the user. The digital device 100 can record a period and a date of wearing the same clothing as attribute information of the external object 211. The digital device 100 can update the attribute information of the external object 211 based on an identified image and time at which the image is identified.

And, the digital device 100 can update the attribute information of the external object 211 based on a predetermined criteria. For example, if it is determined as a user has worn the shirt 211 more than three times or one week has elapsed after the shirt is worn, the digital device 100 can update the attribute information of the shirt 211 to "dirty" from "clean". In particular, the digital device 100 can update not only a status and/or a type of the sensed external object 211 but also the attribute information based on the updated attribute information of the external object 211.

The attribute information of the external object 211 can be regarded as a sort of flag. In particular, if a prescribed condition is satisfied, it may generate a flag for the external object 211. For example, when "clothing" corresponds to the external object 211, if a predetermined condition (e.g., wearing more than 3 times, one week after wearing the clothing) is satisfied, a flag for the external object 211 may operate.

As mentioned earlier with reference to FIG. 3, the digital device 100 senses context information and can generate attribute information associated with the digital device 100 based on the sensed context information. The digital device 100 can match attribute information associated with the external object 211 or updated attribute information with the attribute information associated with the digital device 100.

The sensing of the external object mentioned earlier with reference to FIG. 7 can be selectively combined with the operation of the digital device mentioned earlier with reference to FIGS. 3 to 6.

FIG. 8 is a diagram for a notification associated with an external object notified by a digital device according to one embodiment.

A notification associated with an external object shown in FIG. 8 is basically identical to the notification associated with the external device mentioned earlier with reference to FIGS. 3 to 6. Referring to FIG. 8, the digital device 100 can identify "clothing" and "washing machine". And, the digital device 100 can sense context information such as "wash clothing" from the "clothing" and the "washing machine". For example, the digital device 100 can generate such attribute information associated with the digital device 100 as "clothing" and "washing" from the context information "wash clothing".

And, the digital device 100 can match the "clothing" and "washing" with the "clothing" and "dirty" corresponding to the attribute information associated with the external object. Hence, when a user intends to do the laundry, the digital device 100 can provide 'washing a shirt' to the user as a recommended activity. And, the digital device 100 may provide the user with such a notification as "washing a shirt together" based on the recommended activity. And, the digital device 100 can provide the user with an image of an identified external object together with the notification.

The operations of the digital device 100 mentioned earlier with reference to FIG. 8 can be selectively combined with the operations of the digital device mentioned earlier with reference to FIG. 7.

Figure 9:
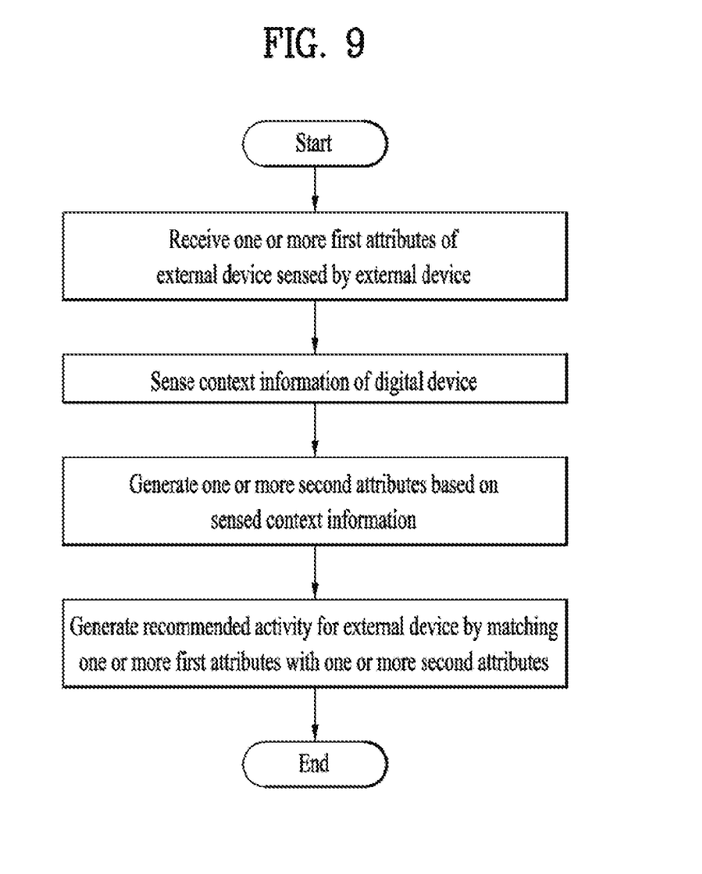
FIG. 9 is a flowchart for a method of controlling a digital device according to one embodiment.

FIG. 9 is a flowchart for a method of controlling a digital device according to one embodiment.

The digital device receives one or more first attributes of an external device sensed by the external device [S901]. As mentioned earlier in FIG. 3, the digital device can receive the first attributes from the external device based on a period or a condition. The digital device can sense context information of the digital device [S902]. As mentioned earlier in FIG. 1, the context information can be sensed by a context sensing unit. The digital device can generate one or more second attributes based on the sensed context information [S903]. The generation of the second attributes is mentioned earlier with reference to FIG. 3. The digital device can generate a recommended activity for the external device by matching one or more first attributes with one or more second attributes [S904]. As mentioned earlier in FIG. 4, the digital device can provide a notification to a user based on the recommended activity. The method of controlling the digital device of FIG. 9 can be selectively combined with the operations of the digital device mentioned earlier with reference to FIGS. 3 to 6 and FIG. 8. Moreover, the digital device performing the method of controlling the digital device described in FIG. 9 can also perform a method of controlling the digital device to be described in FIG. 10.

Figure 10:
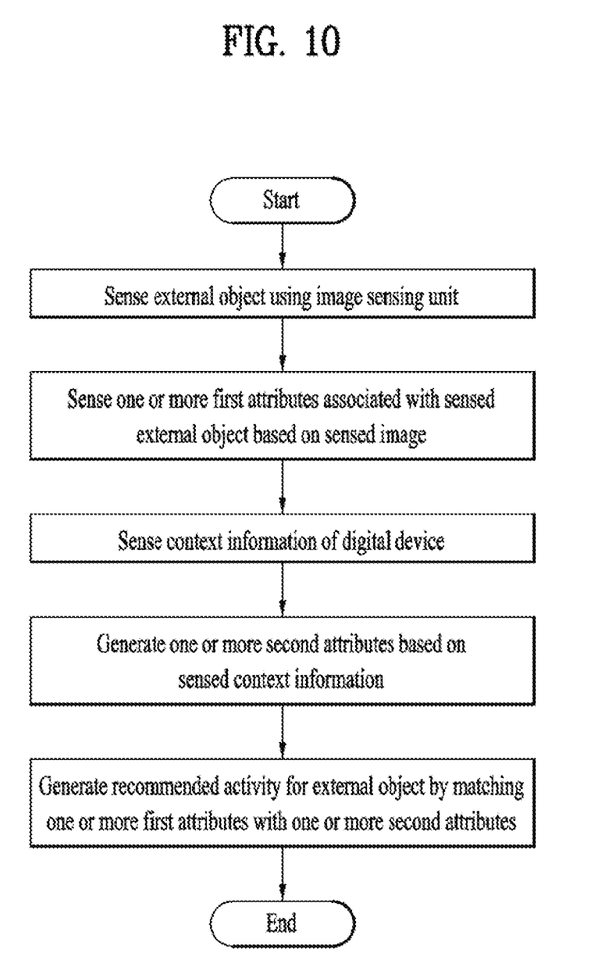
FIG. 10 is a flowchart for a method of controlling a digital device according to a different embodiment.

FIG. 10 is a flowchart for a method of controlling a digital device according to a different embodiment.

The digital device senses an external object using an image sensing unit [S1001]. And, the digital device can generate one or more first attributes associated with the sensed external object based on a sensed image [S1002]. Sensing of the external device and sensing of the first attributes are mentioned earlier with reference to FIGS. 3 and 7. The digital device can senses context information of the digital device [S1003]. The digital device can generate one or more second attributes based on the sensed context information [S1004]. The digital device can perform the generation of the context information and the second attributes mentioned earlier with reference to FIGS. 3 and 8. The digital device can generate a recommended activity for the external device by matching one or more first attributes with one or more second attributes [S1005]. And, the digital device can provide a user with a notification based on the generated recommended activity. The method of controlling the digital device described in FIG. 10 can be selectively combined with the operations of the digital device mentioned earlier with reference to FIGS. 3 to 8.

Meanwhile, the operations of the digital device mentioned earlier with reference to FIGS. 1 to 10 may be non-limited by the aforementioned embodiments. For example, when a user do the laundry, the digital device may recommend the user to wash a different clothing together. Or, when the user drink water, the digital device may recommend the user to water the pot. The aforementioned cases are just an example only. The digital device of the present specification is designed to more deeply analyze a user activity beyond a legacy location based recommended activity. The digital device of the present specification can determine an intelligent recommended activity associated with a user activity.

A digital device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a digital device and a method of controlling therefor can be implemented with software readable by a processor in a recording media readable by the processor, which is equipped in the digital device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

Industrial Applicability

The present invention can be used in a terminal device and is usable in the industry having possibility of repetition.

What is claimed is:

1. A digital device, comprising:
a camera unit configured to capture an image;
a sensor unit configured to sense context of the digital device; and
a processor configured to:
control the camera unit and the sensor unit;
sense a plurality of external objects from the image captured by the camera unit, wherein the external objects are unable to communicate with the digital device;
generate first attributes associated with the plurality of external objects, wherein the first attributes are generated based on status and type of the plurality of external objects that can be identified by the image, and the first attributes are updated by usage record based on identified time;
generate second attributes based on the sensed context;
detect a matched external object that matches with the digital device, from among the plurality of external objects, by comparing the second attributes with the first attributes, based on at least one of identity, similarity, or association; and
generate a recommended activity associated with the matched external object based on the second attributes and the first attributes of the matched external object.

2. The digital device of claim 1, wherein the processor is further configured to:
generate the recommended activity when at least one of the first attributes of the matched external device is matched with at least one of the second attributes.

3. A method of controlling a digital device, comprising:
sensing a plurality of external objects using an image captured by a camera unit, wherein the external objects are unable to communicate with the digital device;
generating first attributes associated with the plurality of external objects, wherein the first attributes are generated based on status and type of the plurality of external objects that can be identified by the image, and the first attributes are updated by usage record based on identified time;
sensing context of the digital device;
generating second attributes based on the sensed context;
detecting a matched external object that matches with the digital device, from among the plurality of external objects, by comparing the second attributes with the first attributes, based on at least one of identity, similarity, or association; and
generating a recommended activity associated with the matched external object based on the second attributes and the first attributes of the matched external object.

* * * * *